(12) United States Patent
Hormati

(10) Patent No.: US 10,819,499 B2
(45) Date of Patent: Oct. 27, 2020

(54) METHOD FOR MEASURING AND CORRECTING MULTIWIRE SKEW

(71) Applicant: Kandou Labs, S.A., Lausanne (CH)

(72) Inventor: Ali Hormati, Ecublens Vaud (CH)

(73) Assignee: KANDOU LABS, S.A., Lausanne (CH)

(*) Notice: Subject to any disclaimer, the term of this patent is extended or adjusted under 35 U.S.C. 154(b) by 0 days.

(21) Appl. No.: 16/489,654

(22) PCT Filed: Feb. 27, 2018

(86) PCT No.: PCT/US2018/020051
§ 371 (c)(1),
(2) Date: Aug. 28, 2019

(87) PCT Pub. No.: WO2018/160603
PCT Pub. Date: Sep. 7, 2018

(65) Prior Publication Data
US 2020/0119901 A1    Apr. 16, 2020

Related U.S. Application Data

(60) Provisional application No. 62/464,597, filed on Feb. 28, 2017.

(51) Int. Cl.
*H04L 7/00*      (2006.01)
*G06F 1/10*      (2006.01)
*H04B 3/462*     (2015.01)

(52) U.S. Cl.
CPC .............. *H04L 7/0037* (2013.01); *G06F 1/10* (2013.01); *H04B 3/462* (2013.01); *H04L 7/0012* (2013.01); *H04L 7/0041* (2013.01); *H04L 7/0054* (2013.01)

(58) Field of Classification Search
CPC ... H04L 7/0037; H04L 7/0012; H04L 7/0041; H04L 7/0054; G06F 1/10; H04B 3/462
(Continued)

(56) References Cited

U.S. PATENT DOCUMENTS 4,839,907 A    6/1989  Saneski
5,334,956 A    8/1994  Leding et al.
(Continued)

OTHER PUBLICATIONS

Wang, Yi-Ming, et al., "Range Unlimited Delay-Interleaving and—Recycling Clock Skew Compensation and Duty-Cycle Correction Circuit", IEEE Transactions on Very Large Scale Integration (VLSI) Systems, vol. 23, No. 5, May 2015, 856-868 (13 pages).

*Primary Examiner* — Helene E Tayong
(74) *Attorney, Agent, or Firm* — Invention Mine LLC

(57) ABSTRACT

Methods and systems are described for sequentially obtaining a plurality of data streams, the plurality of data streams comprising a data stream in a current condition, a data stream in a skewed-forward condition, and a data stream in a skewed-backward condition, calculating, for each data stream in the plurality of data streams, a corresponding set of cost-function values by obtaining a corresponding set of eye measurements, the eye measurements obtained by adjusting a sampling threshold of a sampler generating a plurality of samples of the data stream, the plurality of samples comprising edge samples and data samples, wherein the data stream is sampled at a rate equal to twice a rate of the data stream and calculating the corresponding set of cost-function values based on the corresponding set of eye measurements, and generating a skew control signal based on a comparison of the sets of calculated cost-function values.

15 Claims, 9 Drawing Sheets

(58) Field of Classification Search
USPC .......................................................... 375/354
See application file for complete search history.

(56) References Cited

U.S. PATENT DOCUMENTS

| | | | |
|---|---|---|---|
| 5,798,563 A | 8/1998 | Feilchenfeld et al. | |
| 6,854,030 B2 | 2/2005 | Perino et al. | |
| 7,085,336 B2 | 8/2006 | Lee et al. | |
| 7,123,660 B2 | 10/2006 | Haq et al. | |
| 7,145,411 B1 | 12/2006 | Blair et al. | |
| 7,336,139 B2 | 2/2008 | Blair et al. | |
| 7,366,942 B2 | 4/2008 | Lee | |
| 7,693,088 B2 | 4/2010 | Daugherty et al. | |
| 8,782,578 B2 | 7/2014 | Tell | |
| 9,100,232 B1 | 8/2015 | Hormati et al. | |
| 9,112,550 B1 | 8/2015 | Ulrich | |
| 9,300,503 B1 * | 3/2016 | Holden | H04L 25/4925 |
| 9,450,744 B2 | 9/2016 | Simpson et al. | |
| 9,577,815 B1 | 2/2017 | Simpson et al. | |
| 10,243,614 B1 | 3/2019 | Ulrich et al. | |
| 10,313,068 B1 | 6/2019 | Ahmed et al. | |
| 2001/0055344 A1 | 12/2001 | Lee et al. | |
| 2003/0046618 A1 | 3/2003 | Collins | |
| 2005/0134380 A1 | 6/2005 | Nairn | |
| 2006/0092969 A1 | 5/2006 | Susnow et al. | |
| 2007/0103338 A1 | 5/2007 | Teo | |
| 2008/0175586 A1 | 7/2008 | Perkins et al. | |
| 2010/0153792 A1 | 6/2010 | Jang | |
| 2011/0156757 A1 | 6/2011 | Hayashi | |
| 2011/0268225 A1 | 11/2011 | Cronie et al. | |
| 2012/0020660 A1 | 1/2012 | Le et al. | |
| 2012/0050079 A1 | 3/2012 | Goldman et al. | |
| 2012/0166894 A1 | 6/2012 | Jang | |
| 2013/0249719 A1 | 9/2013 | Ryan | |
| 2014/0112376 A1 | 4/2014 | Wang et al. | |
| 2016/0134267 A1 | 5/2016 | Adachi | |
| 2016/0211929 A1 | 7/2016 | Holden et al. | |
| 2016/0380787 A1 | 12/2016 | Hormati et al. | |
| 2017/0317449 A1 * | 11/2017 | Shokrollahi | H01R 12/73 |
| 2017/0317855 A1 | 11/2017 | Shokrollahi et al. | |

* cited by examiner

METHOD FOR MEASURING AND CORRECTING MULTIWIRE SKEW

CROSS-REFERENCE TO RELATED APPLICATIONS

This application is a 35 U.S.C. 371 of International Application PCT/US2018/020051, entitled, "METHOD FOR MEASURING AND CORRECTING MULTIWIRE SKEW," filed Feb. 27, 2018, which claims the benefit of U.S. Provisional Patent Application No. 62/464,597, filed Feb. 28, 2017, entitled "Method for Measuring and Correcting Multiwire Skew", naming Ali Hormati, which is hereby incorporated by reference herein in its entirety for all purposes.

REFERENCES

The following prior applications are herein incorporated by reference in their entirety for all purposes:

U.S. Patent Publication 2011/0268225 of application Ser. No. 12/784,414, filed May 20, 2010, naming Harm Cronie and Amin Shokrollahi, entitled "Orthogonal Differential Vector Signaling" (hereinafter "Cronie I").

U.S. patent application Ser. No. 13/842,740, filed Mar. 15, 2013, naming Brian Holden, Amin Shokrollahi and Anant Singh, entitled "Methods and Systems for Skew Tolerance in and Advanced Detectors for Vector Signaling Codes for Chip-to-Chip Communication", hereinafter identified as [Holden I];

U.S. patent application Ser. No. 14/612,241, filed Aug. 4, 2015, naming Amin Shokrollahi, Ali Hormati, and Roger Ulrich, entitled "Method and Apparatus for Low Power Chip-to-Chip Communications with Constrained ISI Ratio", hereinafter identified as [Shokrollahi I].

U.S. patent application Ser. No. 14/926,958, filed Oct. 29, 2015, naming Richard Simpson, Andrew Stewart, and Ali Hormati, entitled "Clock Data Alignment System for Vector Signaling Code Communications Link", hereinafter identified as [Simpson I].

U.S. patent application Ser. No. 14/717,717, filed May 20, 2015, naming Richard Simpson and Roger Ulrich, entitled "Control Loop Management and Differential Delay Detection and Correction for Vector Signaling Code Communications Links", hereinafter identified as [Simpson II].

U.S. patent application Ser. No. 14/315,306, filed Jun. 25, 2014, naming Roger Ulrich, entitled "Multilevel Driver for High Speed Chip-to-Chip Communications" (hereinafter called "Ulrich I");

The following additional references to prior art have been cited in this application:

U.S. Pat. No. 7,693,088, issued Apr. 6, 2010, naming Dwight D. Daugherty et al, entitled "Method and Apparatus for Data Rate Detection using a Data Eye Monitor", hereinafter identified as [Daugherty].

FIELD OF THE INVENTION

Present embodiments relate to communications systems circuits generally, and more particularly to measurement and reduction of differential signal arrival times for a received communications signal transmitted over a high-speed multi-wire interface used for chip-to-chip communication.

BACKGROUND

In modern digital systems, digital information is processed in a reliable and efficient way. In this context, digital information is to be understood as information available in discrete, i.e., discontinuous values. Bits, collections of bits, but also numbers from a finite set can be used to represent digital information.

In most chip-to-chip, or device-to-device communication systems, communication takes place over a plurality of wires to increase the aggregate bandwidth. A single wire or pair of wires may be referred to as a channel or link and multiple channels create a communication bus between the electronic components. At the physical circuitry level, in chip-to-chip communication systems, buses are typically made of electrical conductors in the package between chips and motherboards, on printed circuit boards ("PCBs") or in cables and connectors between PCBs. In high frequency applications, microstrip or stripline PCB traces may be used.

Common methods for transmitting signals over bus wires include single-ended and differential signaling methods. In applications requiring high speed communications, those methods can be further optimized in terms of power consumption and pin-efficiency, especially in high-speed communications. More recently, vector signaling methods have been proposed to further optimize the trade-offs between power consumption, pin efficiency and noise robustness of chip-to-chip communication systems. In such vector signaling systems, digital information at the transmitter is transformed into a different representation space in the form of a vector codeword that is chosen to optimize the power consumption, pin-efficiency and speed trade-offs based on the transmission channel properties and communication system design constraints. Herein, this process is referred to as "encoding". The encoded codeword is communicated as a group of signals, typically communicated essentially in parallel over multiple wires or communications channels, from the transmitter to one or more receivers. At a receiver, the received signals corresponding to the codeword are transformed back into the original digital information representation space. Herein, this process is referred to as "decoding".

Regardless of the encoding method used, the received signals presented to the receiving device are sampled (or their signal value otherwise recorded) at intervals best representing the original transmitted values, regardless of transmission channel delays, interference, and noise. The timing of this sampling or slicing operation (i.e., a thresholding operation to determine a nearest signal point) is controlled by an associated Clock and Data Alignment (CDA) timing system, which determines the appropriate sample timing. Where the group of signals is communicated essentially in parallel over multiple wires or communications channels, variations in propagation delay over the multiple wires or channels can cause elements comprising one group of signals or codeword element to be received at different times. This "skew" may, if uncorrected, prevent codewords from being received as coherent entities, and thus thwart decoding.

BRIEF DESCRIPTION

To reliably detect the data values transmitted over a communications system, a receiver accurately measures the received signal value amplitudes at carefully selected times. For vector signaling codes communicated essentially in parallel, this timing selection is composed of two parts: accurate sampling of individual codeword elements received on individual wires or communications channels, and accurate interpretation of the entire received codeword, regardless of timing variations in reception of it component elements.

These differential propagation times across the vector signaling code codeword, or "skew", may be caused by variations in transmission path length or propagation velocity, and may be constant or vary over time. Thus, accurately measuring skew at the receiver is useful for subsequent skew correction, which as one example may be performed by introducing variable delays into the individual wire or symbol data paths prior to codeword decoding.

Methods and systems are described for sequentially obtaining a plurality of data streams, the plurality of data streams comprising a data stream in a current condition, a data stream in a skewed-forward condition, and a data stream in a skewed-backward condition, calculating, for each data stream in the plurality of data streams, a corresponding set of cost-function values by obtaining a corresponding set of eye measurements, the eye measurements obtained by adjusting a sampling threshold of a sampler generating a plurality of samples of the data stream, the plurality of samples comprising edge samples and data samples, wherein the data stream is sampled at a rate equal to twice a rate of the data stream and calculating the corresponding set of cost-function values based on the corresponding set of eye measurements, and generating a skew control signal based on a comparison of the sets of calculated cost-function values.

DETAILED DESCRIPTION

As described in [Cronie I], vector signaling codes may be used to produce extremely high bandwidth data communications links, such as between two integrated circuit devices in a system. Multiple data communications channels transmit symbols of the vector signaling code, acting together to communicate codewords of the vector signaling code. Depending on the particular vector signaling code used, the number of channels comprising a communications link may range from two to eight or more. Individual symbols, e.g. transmissions on any single communications channel, may utilize multiple signal levels, often three or more.

Embodiments herein may also apply to any communication or storage methods requiring coordination of multiple channels or elements of the channel to produce a coherent aggregate result.

Input Sampling Circuits

Conventional practice for a high-speed integrated circuit receiver includes terminating each data line (after any relevant front end processing such as amplification and frequency equalization) in a sampling device. This sampling device performs a measurement constrained in both time and amplitude dimensions; in one example embodiment, it may be composed of a sample-and-hold circuit that constrains the time interval being measured, followed by a threshold detector or digital comparator that determines whether the signal within that interval falls above or below (or in some embodiments, within bounds set by) a reference value. In another embodiment, it may be comparable to an edge-triggered flip-flop, sampling the state of its input in response to a clock transition. Subsequently, this document will use the term sampling device, or more simply "sampler" to describe this receiver input measurement function as it implies both the time and amplitude measurement constraints, rather than the equivalent but less descriptive term "slicer" synonymously used in the art.

Figure 3:
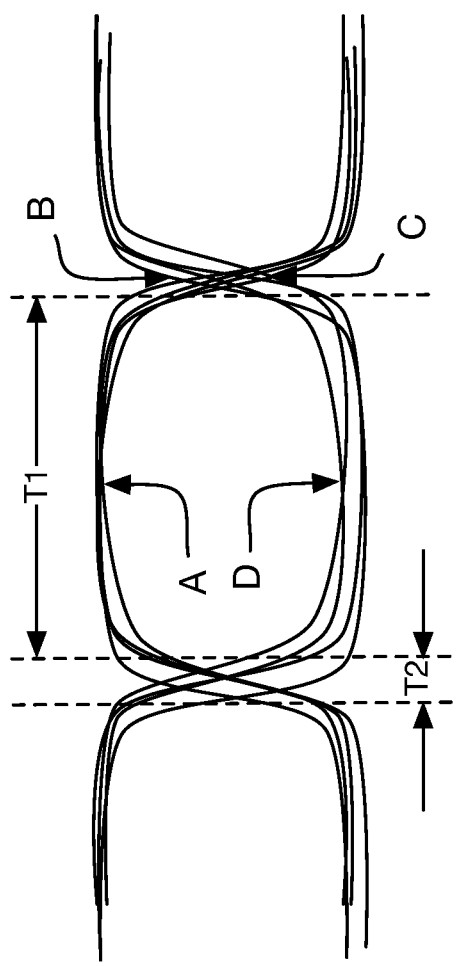
FIG. 3 shows a partial received signal eye diagram (showing only signal transitions) for a vector signaling code detector, identifying features relevant to the described measurements.

The receiver "eye plot" as illustrated in FIG. 3 graphically illustrates input signal values that will or will not provide accurate and reliable detected results from such measurement, and thus the allowable boundaries of the time and amplitude measurement windows imposed on the sampler.

A Clock Data Alignment or CDA circuit supports such sampling measurements by extracting timing information, either from the data lines themselves or from dedicated clock signal inputs, and utilize that extracted information to generate clock signals to control the time interval used by the data line sampling device(s). The actual clock extraction may be performed using well known circuits such as a Phase Locked Loop (PLL) or Delay Locked Loop (DLL), which in their operation may also generate higher frequency internal clocks, multiple clock phases, etc. in support of receiver operation. These sampling clocks are "aligned" with the data to be sampled to optimize the quality and accuracy of the sampled results, typically by configuring the CDA so that sampling occurs when the signal to be sampled is stable, the so-called "center of eye" timing intervals identified by the arrow marks in FIG. 2A.

System Environment

For purposes of description and without implying limitation, the following examples assume a communications system environment comprising interconnection of one transmitting and one receiving integrated circuit device via eight wires of equal path length up to 25 millimeters and identical transmission line characteristics, at a signaling rate of 25 Gigabit/second/wire, equivalent to a transmission unit interval of 40 picoseconds. The 5b6w "Glasswing" vector signaling code of [Shokrollahi I] is used to communicate five data values (each carried by a subchannel of the vector signaling code, as subsequently described) over six of the wires, with the remaining two wires communicating a clock signal. In such an example environment, adequate signal reception may be obtained using Continuous Time Linear Equalization or CTLE, without need for advanced receive equalization such as obtained using Decision Feedback Equalization (DFE) methods.

It is further assumed that this example communications channel may include skew, such as might be induced by variations in printed circuit board composition or trace routing. "Low skew" examples will presume a variation of less than 5 psec among signal propagation times on the various wires, and "High skew" examples will presume a variation of as much as 30 picoseconds, without implying limitation. Thus, embodiments correcting Low skew generally address maximization of horizontal eye opening in a system in which the eyes are already partially open, while embodiments correcting High skew may first need to address one or more subchannels not detecting any horizontal eye opening at all.

Figure 1:
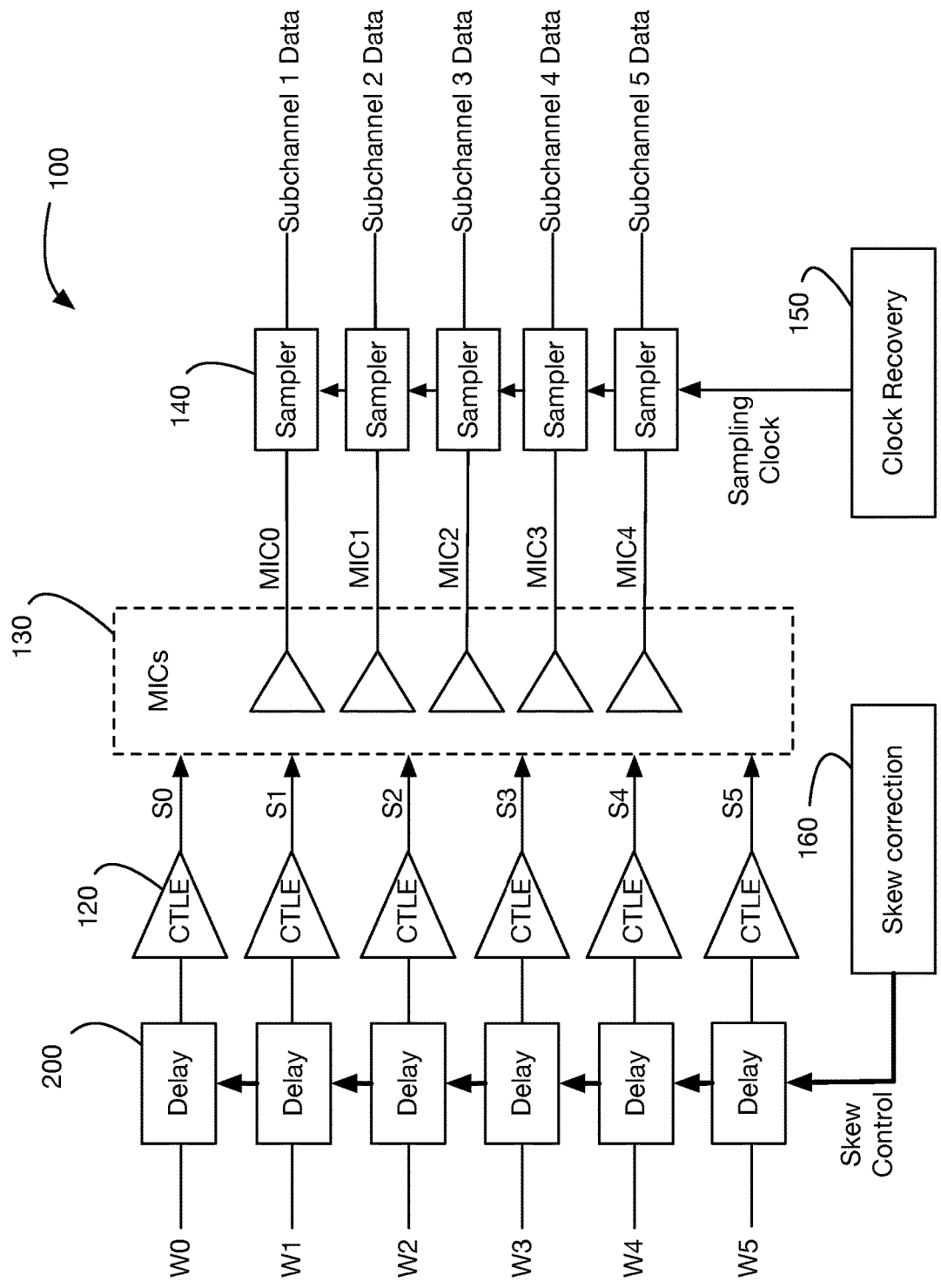
FIG. 1 shows a receiver embodiment compatible with the described method.

One example embodiment of a communications receiver for vector signaling code is shown in FIG. 1. In that block diagram, six data wire inputs W0 through W5 are each processed by a delay element 200, the resulting signals then passed to Continuous Time Linear Equalizers (CTLE) 120 for optional amplification and/or frequency compensation. It is also common for CTLE circuits to be configured to provide additional high-frequency gain (also known as high frequency "peaking") to compensate for frequency-dependent transmission medium losses. The resulting processed wire signals S0-S5 are presented to Multi-input comparators (MICs) 130, which decode the subchannels of the vector signaling code MIC0-MIC4. These subchannel outputs are sampled 140 at time intervals determined by Clock Recovery subsystem 150 (performing the CDA functions as previously described) producing subchannel 1-5 data outputs.

In some embodiments, additional samplers are provided for some or all subchannel outputs, to facilitate timing analysis and/or management. As one example, such an additional sampler may be triggered using an earlier or later clock to detect signal transitions and thus optimize CDA operation. As another example, such an additional sampler may be configured with an adjustable offset slicer voltage, to facilitate measurement of vertical eye opening.

Differential arrival times or "skew" of the various wire signals may delay or interfere with proper detection of the vector signaling code. This skew may be caused by variations in transmission path element's (e.g., the wire) length or propagation velocity, and may be constant or vary over time. Thus, accurately measuring skew at the receiver is useful for subsequent skew correction, which as one example may be performed by introducing variable delays into the individual symbol data paths prior to codeword decoding.

In some embodiments, an apparatus includes a sampler 140 configured to sequentially receive a plurality of data streams, and for each data stream, generate a corresponding set of samples by sampling the data stream using a sampling clock having a rate equal to twice a rate of the data stream, the plurality of data streams comprising a data stream in a current condition, a data stream in a skewed-forward condition, and a data stream in a skewed-backward condition, the plurality of samples comprising edge samples and data samples. The apparatus further includes a skew control circuit 160 configured to generate a skew control signal, the skew control circuit including an eye-measurement circuit 605 configured to form a corresponding set of eye measurements for each data stream, the eye measurements formed by adjusting a sampling threshold of the sampler generating the set of samples, a cost-function calculator 610 configured to calculate a corresponding set of cost-function values based on the corresponding set of eye measurements, and a cost-function comparison circuit 615 configured to generate the skew control signal based on a comparison of the sets of calculated cost-function values.

In some embodiments, the apparatus further includes a multi-input comparator (MIC) 130 configured to provide the plurality data streams to the sampler. In some embodiments, the apparatus further includes a delay circuit 200 configured to set an input wire to the MIC to a current, a skewed-forward, and a skewed-backward condition. In some embodiments, the delay circuit is configured to set the input wire by adjusting a node capacitance of the wire. In some embodiments, the skew control signal comprises a plurality of bits, and the delay circuit 200 is configured to connect one or more capacitors to the wire by enabling one or more transistors according to the plurality of bits of the skew control signal. In some embodiments, the skew control signal is sent to a transmitter via a backchannel, and the transmitter is configured to set the current, skewed-forward, and skewed-backward conditions.

In some embodiments, the plurality of eye measurements comprises top and bottom of eye measurements (shown in FIG. 3 as eye measurements A and D, respectively), and top and bottom of edge sample measurements (shown in FIG. 3 as eye measurements B and C, respectively). Note that FIG. 3 only depicts transition signal traces. The measurement circuit includes signal transition detection, or data pattern analysis, as described herein such that 0-1 and 1-0 transitions ensure that the values for B and C are properly captured.

In some embodiments, each data stream is a half-rate data stream, and wherein the sampling clock is a full-rate sampling clock. In some embodiments, each data stream is a full-rate data stream, and wherein the sampling clock is a double-rate sampling clock. In some embodiments, the skew control signal is configured to generate a coarse skew control signal by sampling half-rate data streams using a full-rate sampling clock, and to subsequently generate a fine skew control signal by sampling full-rate data streams using a double-rate sampling clock.

Figure 4:
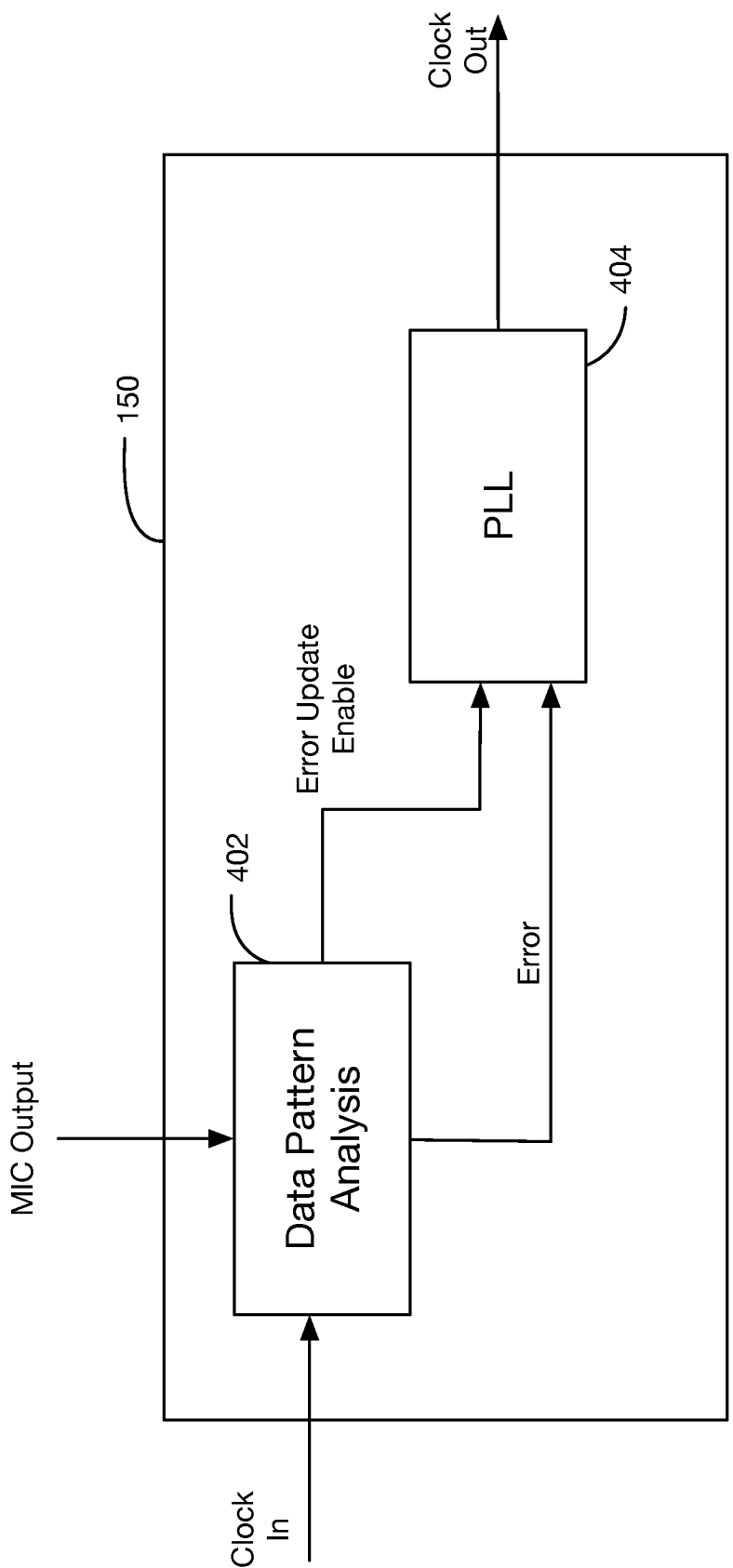
FIG. 4 is a block diagram of a clock recovery circuit, in accordance with some embodiments.
Figure 5:
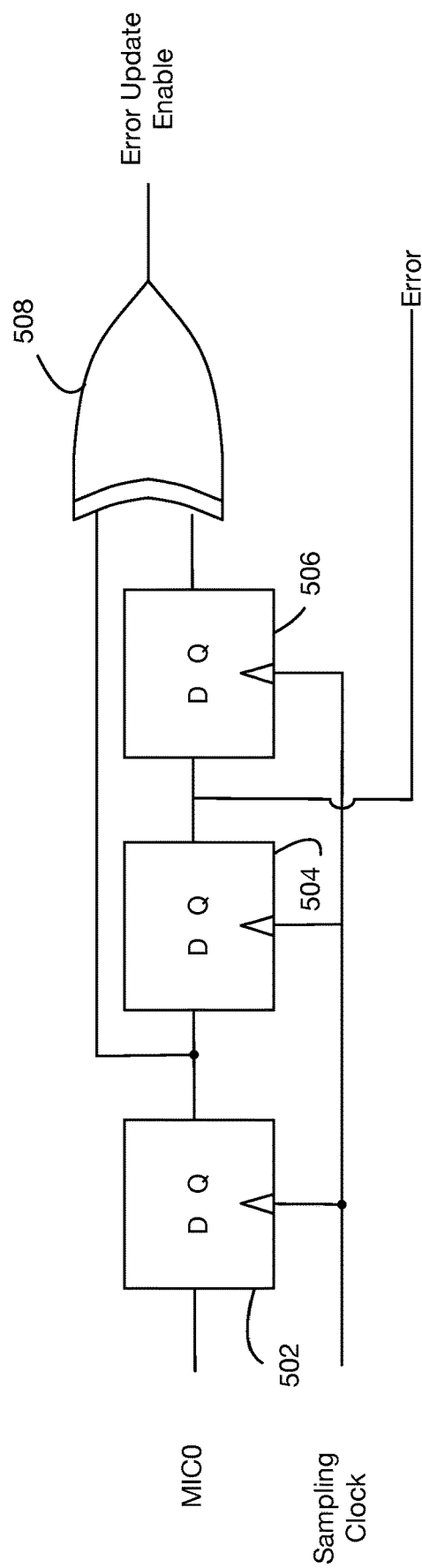
FIG. 5 is a block diagram of a data pattern analysis circuit, in accordance with some embodiments.

FIG. 4 is a block diagram of a clock recovery circuit 150, in accordance with some embodiments. As shown, clock recovery circuit 150 includes a data pattern analysis module 402 and a phase-locked loop (PLL) 404. The data pattern analysis block 402 may determine that a transition has occurred to enable the PLL 404 to adjust the sampling clock according to an error signal. FIG. 5 illustrates an exemplary data pattern analysis module 402, in accordance with some embodiments. As shown, data pattern analysis block 402 includes three D-flip flops 502, 504, and 506. The outputs of flip flops 502 and 506 may be XOR'd 508 to determine if a transition has occurred (either high-to-low or low-to-high). The output of flip flop 504 may indicate whether the sampling clock is too early or too late, which may be used as an error signal, or used to determine an error signal by PLL 404 and adjust the output clock of the PLL. While D flip-flops are shown, it should be noted that other known memory circuits, shift registers, and various other devices may be used to identify transitions are occurring. A clock recovery circuit 150 described above may be used to generate a sampling clock that is twice the rate of the received data stream, the sampling clock sampling the data stream at transitions and during the middle of the symbol. Some embodiments may incorporate filters to periodically update the sampling clock, including but not limited to updating once every X transitions or unit intervals.

Skew Adjustment and Compensation

Both the described measurement method and the eventual skew elimination required for normal operation incrementally offset individual wire signals in time to compensate for arrival time variations.

Various embodiments may incorporate known art methods in either the analog or digital domain utilizing variable delay elements, adjustable FIFO buffers, etc. in combination with the described embodiments, as illustrated by delay elements 200 of FIG. 1 under control of the skew-control signal from skew control circuit 160.

Figure 8:
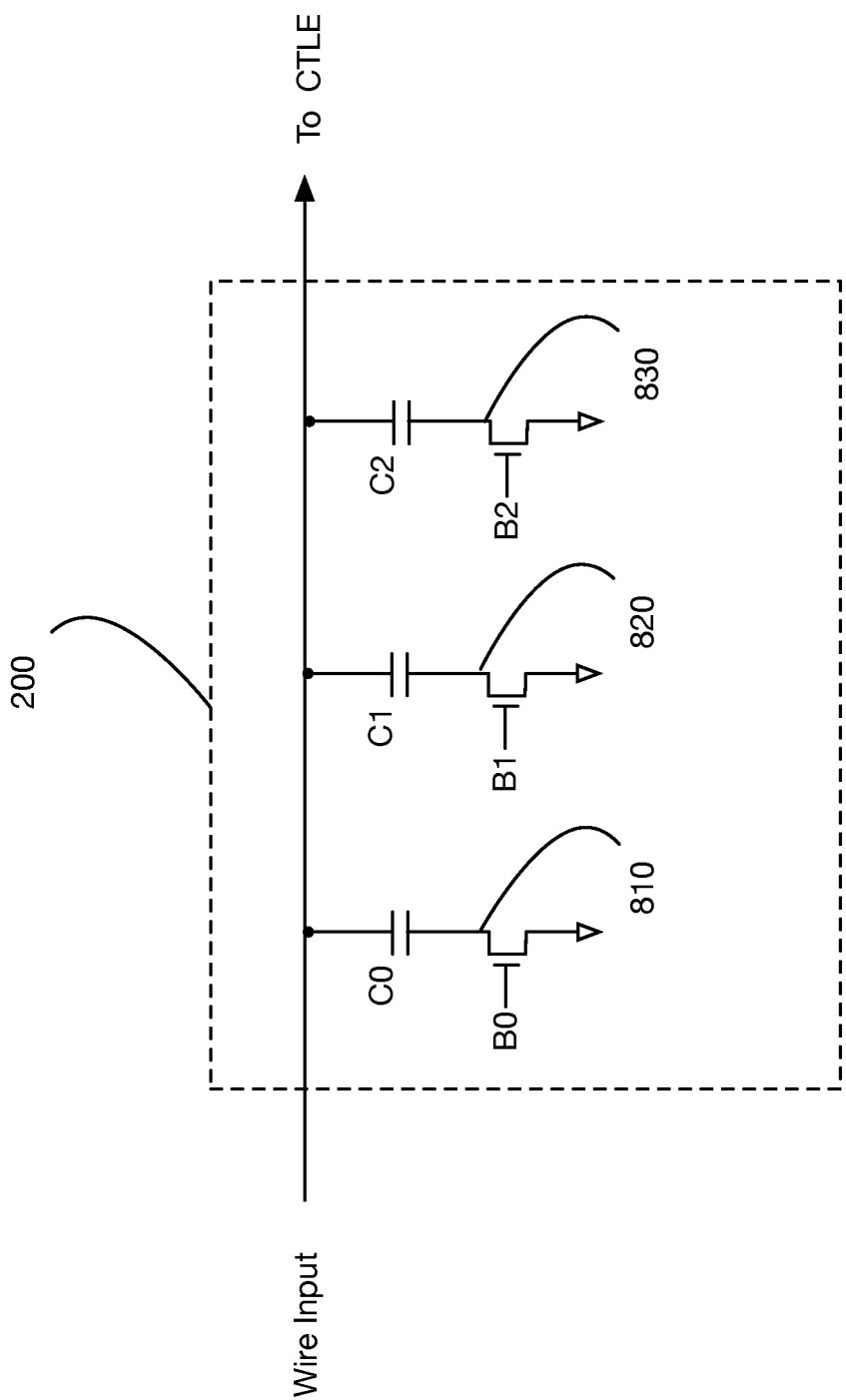
FIG. 8 is a schematic of an adjustable input delay block, in accordance with some embodiments.

One embodiment of such a Delay element suitable for Low skew conditions is shown in FIG. 8. Transistors 810, 820, and 830 may be enabled respectively by Skew control inputs $B_0$, $B_1$, $B_2$ to increase the Wire Input node's capacitance to ground by amounts determined by capacitors $C_0$, $C_1$, $C_2$. This added node capacitance, in association with the source and termination impedances of the incoming transmission line, introduces an increased delay into the wire signal. In some embodiments, the amount of capacitance connected to the wire input node corresponds to a wire-specific skew value associated with the wire input node. By adjusting the capacitance according to a multi-bit skew control signal, the wire-specific skew value may be adjusted.

An alternative embodiment introduces the delay element 200 elsewhere in the wire signal path; as a non-limiting example, at the output of each CTLE stage rather than at the wire inputs of the receiver.

In one embodiment, $C_0$, $C_1$, $C_2$ values of 5 fF, 10 fF, 20 fF allows binary increments of capacitance to be added, up to an additional aggregate capacitive value of 35 femtoFarads, corresponding to approximately 5 picoseconds of additional delay. As a side effect, the added capacitance also slightly degrades high frequency response, with the same embodiment experiencing 1.5 dB degradation in return loss or (also generally known as $S_{11}$) at 12.5 GHz, when configured to introduce the maximum 5 psec delay.

With the example three bit skew control signal for each of the six wires, the overall skew control signal may be embodied as an eighteen-bit digital control word suitable for configuration or adjustment by, as one example, a Skew Correction 160 or other management processor executing the algorithm subsequently described herein.

Neither the example capacitive values nor the number of switchable capacitors implies limitation, with other embodiments incorporating fewer or greater numbers of capacitors with equal values, values in binary ratio, or predetermined values calculated to address particular anticipated conditions, those capacitors being selectable individually or in combination.

Another embodiment compatible with high-skew environments samples the wire signals using an analog track-and-hold or sample-and-hold circuit acting as delay element 200, at skew-modified times during which the individual wire signals are stable, with sampling 140 of the resulting MIC subchannel outputs using Sampling Clock being delayed by clock recovery circuit 150 until at least the latest of those skew-modified times.

A further embodiment utilizes transmit-side adjustments of individual wire transmission times, as commanded by the measurement receiver via a reverse communications channel. As one example, the transmission line driver of [Ulrich I] may be configured to provide such capability through independent adjustment of the phase of the clock used to output data on each output wire.

Receiver Data Detection

As described in [Holden I], vector signaling codes may be efficiently detected by linearly combining sets of input signals using Multi-Input comparators or mixers (MIC). For the example 5b6w code, five such mixers acting on weighted subsets of the six received data input signals will detect the five data bits without need of further decoding.

As shown in FIG. 1, one embodiment of a data receiver is composed of six identical CTLE stages 120 operating on the six data wires. This collection of equalized received signals is presented to a set of five MIC mixers 130. [Shokrollahi I] teaches a set of multi input comparators detecting the 5b6w code defined by Eqn. 1-5:

$$MIC0 = S0 - S1 \qquad \text{(Eqn. 1)}$$

$$MIC1 = \tfrac{1}{2} S0 + \tfrac{1}{2} S1 - S2 \qquad \text{(Eqn. 2)}$$

$$MIC2 = S3 - S4 \qquad \text{(Eqn. 3)}$$

$$MIC3 = \tfrac{1}{2} S3 + \tfrac{1}{2} S4 - S5 \qquad \text{(Eqn. 4)}$$

$$MIC4 = \tfrac{1}{3} S0 + \tfrac{1}{3} S1 + \tfrac{1}{3} S2 - \tfrac{1}{3} S3 - \tfrac{1}{3} S4 - \tfrac{1}{3} S5 \qquad \text{(Eqn. 5)}$$

Where S0-S5 are the (optionally amplified, equalized, and deskewed) signals received from communication wires W0-W5 respectively.

Receiver Eye Measurements

FIG. 3 shows a typical receiver eye diagram, plotting the history of multiple received signal unit intervals over time. The receive "eye" used for data detection is characterized by its "opening", the region in amplitude and time in which a valid data result may always be obtained.

In the case of vector signaling codes as described in [Cronie I] and [Shokrollahi I], the relevant eye measurements are at the subchannel level, e.g. at the sampling point following the mixing operation of a Multi Input Comparator as taught by [Holden I]. As in many embodiments the signaling rate is designed to utilize the maximum communications media capacity, it is typical for the transition regions of the received wire signals to have considerable slope, rounding the appearance of the eye. In such a situation, the mixing behavior of the MIC on the sloped transitions of the partially overlapping input components acts as a phase interpolator, with the resulting mixed output result presenting a transition phase or timing intermediate between that of its input components. Thus, skew among its input components may result in the horizontal eye opening for data (i.e. the "eye opening") of the encoded subchannel being offset from its nominal timing by a data-dependent amount, leading to an effective reduction in horizontal eye opening. Similarly, the location of signal transitions becomes data-dependent, effectively increasing the width of the transition regions preceding and/or following the data eye.

Figure 2A:
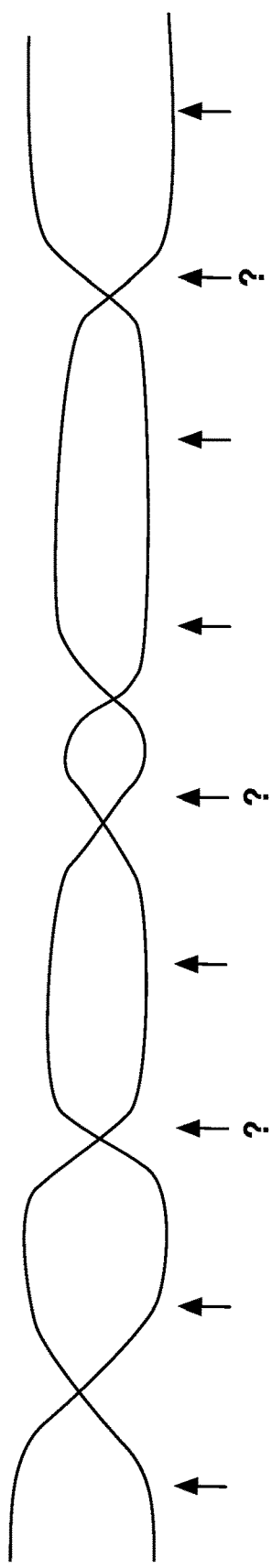
FIG. 2A shows the sampling intervals for a subchannel with high skew.
Figure 2B:
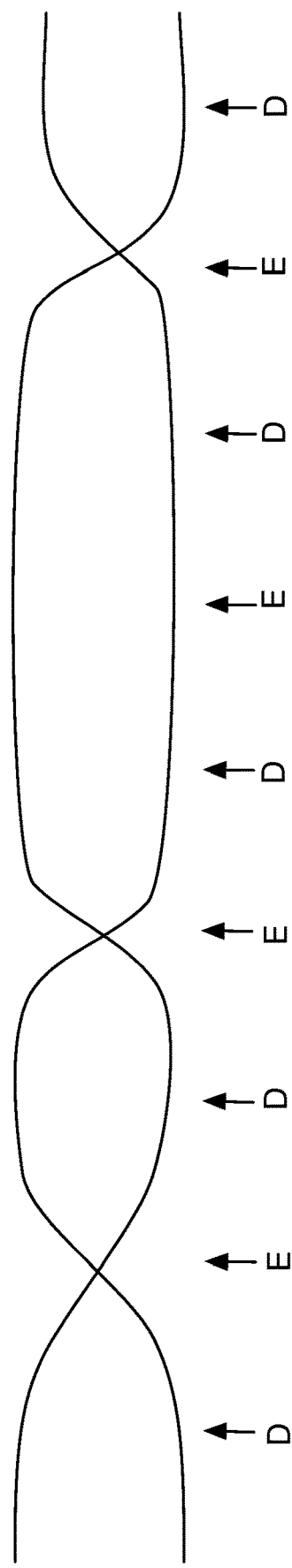
FIG. 2B shows the same sampling intervals for a subchannel in which transmit data is duplicated in consecutive unit intervals.

For vector signaling code systems with high uncorrected skew, it is possible for the receive eyes of one or more subchannels to be fully closed (i.e. leading to unreliable or invalid sampled data) as identified by the sampling interval times flagged with a question mark in FIG. 2A. In this situation, an effective reduction in signaling rate may be temporally obtained (e.g. during an initialization or adjustment procedure) by configuring the transmitter to emit each codeword multiple times. For example, transmitting each codeword twice effectively doubles the potential receive window during which valid subchannel data may be obtained and, by inference, similarly increases the amount of skew that can be measured. As shown in FIG. 2B for the example of transmitting each codeword twice, the first of each pair of sampling intervals labeled "E" at the receiver occurs during signal edge transitions, while the second of each pair of sampling intervals labeled "D" occurs during a period of stable and valid data.

Skew Identification and Iterative Minimization

As shown in FIG. 3, the eye opening is measured in the amplitude direction by signal amplitude AD, and in the time dimension by interval T1. The transition region is typically characterized in the time dimension as interval T2, but (due to the signal slope effects described above) may also be measured indirectly in the amplitude dimension as dimension BC.

Figure 6:
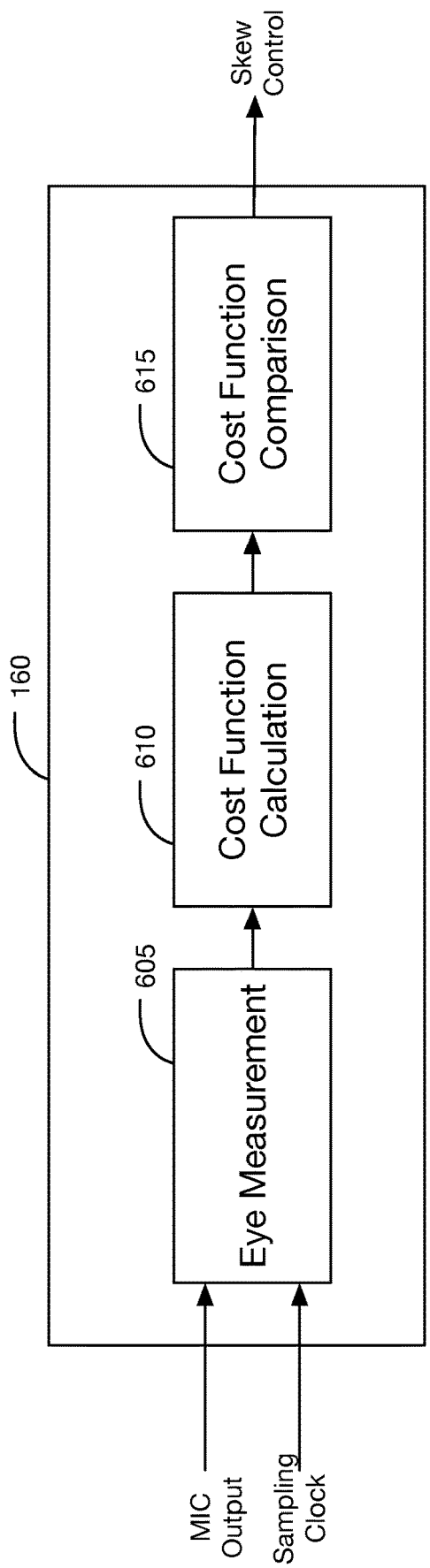
FIG. 6 is a block diagram of a skew control circuit, in accordance with some embodiments.

FIG. 6 illustrates a skew-control circuit 160, in accordance with some embodiments. As shown, skew-control circuit 160 includes an eye measurement circuit 605, a cost function calculator 610, and a cost function comparison circuit 615.

The eye-measurement block 605 calculates sets of eye-measurements ABCD for the skew control signal in each condition of current, skewed forward, and skew backward prior to sending each set of eye-measurements to the cost function calculator 610. In some embodiments, the eye-measurement block 605 may include components from the aforementioned sampler 140.

Figure 9:
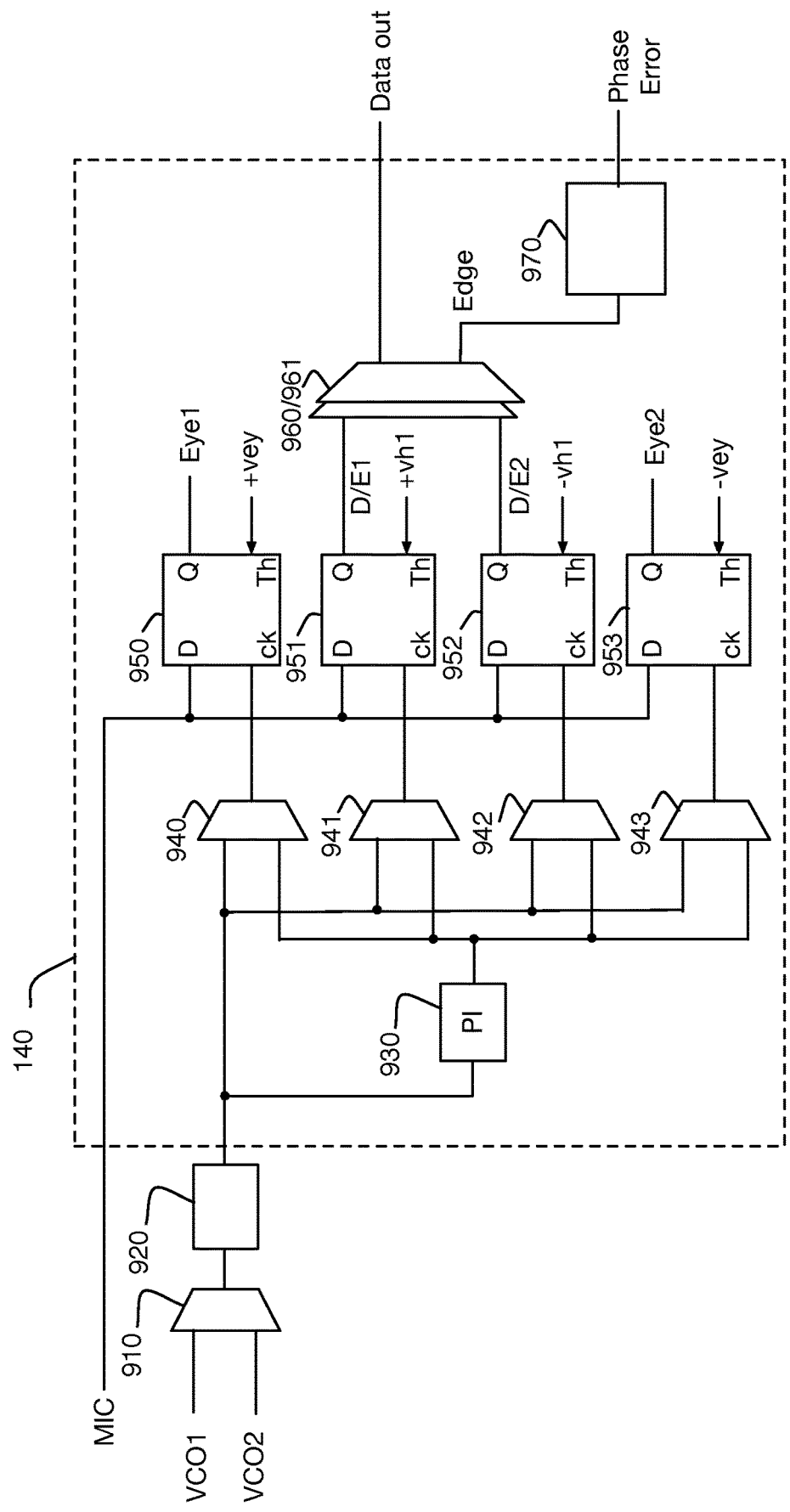
FIG. 9 is a block diagram of a sampler, in accordance with some embodiments.

FIG. 9 illustrates a set of components of an eye-measurement block 605 that may be included in a sampler 140, in accordance with some embodiments. as previously described in relation to FIG. 1. One or more sampling clocks produced by one or more VCOs (e.g., VCO 1 and VCO 2) may be selected by multiplexer 910, and optionally delayed by adjustable delay buffer 920. The data sampling function is shown in this embodiment as four clocked samplers (which may also be referred to herein as slicers) 950, 951, 952, 953. In one embodiment, the samplers are clocked analog integrate-and-hold elements, although no limitation is implied as known art sample-and-hold, track-and-hold, clocked comparator, and other comparable circuits are equally applicable.

Each sampler accepts an input signal at D, and compares the state of D relative to a threshold Th at the time determined by the sampling clock received at ck with the result available at output Q. Samplers 951 and 952 may be provided with speculative DFE correction values +vh1 and −vh1, corresponding to DFE correction values of previous data values "high" and "low" respectively. Thus one of results D/E1 and D/E2 will be chosen by multiplexer 960 as the received data value, with the other result (a potential edge transition) directed by multiplexer 961 to a Phase Comparator/Charge Pump 970 to produce a Phase Error signal for adjusting the PLL in the event a transition has occurred from the previously detected data value.

A comparable multiplexer to that illustrated as 960 selects between signals Eye1 and Eye2 based on the previous received data value, to obtain a measurement result for generation of a statistical eye diagram corresponding to amplitude thresholds +vey, −vey and the timing offset provided by adjustable delay buffer to allow rotation of the sampling clock around the unit interval. As shown, amplitude thresholds +vey, −vey may be adjusted as the variable-phase-offset clock is rotated throughout the unit interval to determine values for +vey (A, B) and −vey (C, D) corresponding to the top and bottom of the eye at various times in the unit interval, including near the center of the eye (e.g., a data sample), as well as at edges of the eye (e.g., edge or transition samples). Using the determined values A, B, C, and D for each point in the unit interval, a 2-dimensional diagram of an eye may be generated, and cost functions operating on the determined values may be analyzed to increase vertical and/or horizontal eye openings by adjusting wire-specific skew values.

In some embodiments, phase interpolators 930 may be used instead of adjustable delay buffers, as shown in FIG. 9. Thus, as one example, 930 is a phase interpolator producing a variable-phase-offset clock which may be provided to samplers 950 and 953 for eye measurement. As shown in FIG. 9, multiplexors 941/942 may be configurable to direct the data-sampling clock to data samplers 951/952, while multiplexors 940/943 may be configurable to direct the variable-phase-offset eye-measurement clock to eye samplers 950/953. In some embodiments, the multiplexors 941/942 may direct the selected local oscillator signal to the data samplers 951/952, while conversely the multiplexors 940/943 are configured to direct the output of the phase interpolator 930 to eye samplers 950/953. Alternatively, multiplexors 941/942 may direct the output of phase interpolator 930 to the data samplers 951/952, while conversely the multiplexors 940/943 are configured to direct the selected local oscillator signal to eye samplers 950/953. In some embodiments, phase interpolator 930 may have an associated delay. In such embodiments, the phase interpolator delay may be measured and then accounted for in subsequent operation. In one embodiment, the local oscillator signal may be applied to the data samplers 951/952 and the phase interpolator may adjust the local oscillator signal until the edge of the eye is detected. This provides an interpolator code that represents an offset to the edge of the eye, which, together with the interpolator error is the full offset. Then, the roles of the clock signal may be switched via the multiplexors such that the phase interpolator is rotated until the edge of the eye is detected is by samplers 950/953. Note that as this rotation is occurring, the error signals generated by samplers 951/952 keep the combined local oscillator and phase interpolator output locked to the middle of the eye. The resulting interpolator code may be combined with the first interpolator code to determine the interpolator delay.

As previously described, the received signal MIC is produced by at least one multi-input comparator (MIC) connected to a plurality of wires of a multiwire bus, the MIC configured to form a received data signal. A clock generator PLL, including at least a local oscillator and an adjustable phase interpolator 930 is configured to generate a data-sampling clock and a variable-phase-offset eye-measurement clock. At least one data slicer is configured to receive the data sampling clock and configured to generate a receive sample of the received data signal, and at least one eye slicer is configured to receive the variable-phase-offset eye-measurement clock and configured to generate a plurality of eye characteristic measurements. In some embodiments, multiplexors 941 and 942 are configured to provide one of the local oscillator signal VCO1/VCO2 and the signal generated by the phase interpolator 930 to the data slicers 951 and 952, respectively. In such embodiments, multiplexors 940 and 943 may be configured to provide the other of the local oscillator signal and the phase interpolator signal to eye slicers 950 and 953, respectively. In an embodiment utilizing Decision Feedback Equalization (DFE), the eye slicer may include a first eye slicer having a positive threshold offset, and a second eye slicer having a negative threshold offset. Such offsets may be adjusted in order to make eye characteristic measurements to determine a vertical opening of the eye. For example, while the variable-phase-offset eye-measurement clock is rotated forwards and backwards within a given unit interval, threshold offsets ±vey may be adjusted higher and lower to determine the eye height at various locations in the unit interval.

In some embodiments, determining eye-measurements B and C as shown in FIG. 3 may include adjusting a sampling clock using the phase interpolator 930 to be on data edges eye-measurement block 605 incrementally increasing a sampler decision threshold $V_{TH}$=+vey of a corresponding sampler 950 until no '1' values are seen for sample times "E" where the previous and next values sampled at "D" are not identical (e.g., a transition has occurred), as shown in FIG.

2B. Similarly, point C is measured by incrementally lowering the sampler threshold $V_{TH}$=−vey of sampler 953 until no '0' values are seen for sampler times "E" where the previous and next values sampled at "D" are not identical. In some embodiments, determining the eye-measurement point B and C includes determining that no '1/0' values seen includes determining that a threshold percentage of '0/1' values are seen, respectively.

In some embodiments, determining a "top of open eye" eye-measurement A as shown in FIG. 3, may be performed similar to determining B described above, include eye-measurement block 605 incrementally increasing a sampling decision threshold $V_{TH}$=+vey of a corresponding sampler 950 until reliable detection (e.g. using a threshold value) of data "1s" cannot be obtained according to a sampling clock that is centered in the data interval. Similarly, finding a "bottom of open eye" eye-measurement D may include decreasing the threshold $V_{TH}$=−vey until reliable detection of data "0s" cannot be obtained. Similar threshold percentages may be used as described above when determining eye-measurements A and D.

In some embodiments, cost function calculator 610 may be configured to receive sets of eye-measurements from the eye-measurement block 605, and to generate respective cost functions for eye measurements for each condition. Cost function comparison block 615 may then compare each cost function, and set the skew control signal accordingly, as described in more detail below.

The algorithm run by cost function comparison 615 finds the skews by maximizing a specific cost function. As shown in FIG. 3, points B and C determine the height of the cross-over region (the edge samples) and points A and D denote the height of the eye. Cost function comparison 615 may compare the calculated cost function values as described below:
 1. The best skew is the one which maximizes the distance between A and D, i.e., maximizes the eye height on the worst received subchannel
 2. The best skew is the one which maximizes the distance between points A and B, i.e., maximized the eye height and minimized the cross-over region on the worst received subchannel
 3. The best skew is the one which minimized the distance between points B and C, i.e., minimized the cross-over region on the worst received subchannel Although any of the three cost-functions above can be used, one embodiment relies on the second cost function; the width of the cross-over region responds more quickly to the changes in skew thus making this cost function more sensitive, but vertical eye opening optimization is also included as an optimization goal, thus this cost function provides a compromise between eye height and cross-over region width.

In some embodiments, the data receiver utilizes a hardware embodiment comprising a data sampler 140 performing its measurement of at least one MIC subchannel output at a timing interval controlled by the system's receive clock subsystem configured to optimally sample data (i.e. not independently adjustable for skew measurement), the sampler making its digital output decision relative to an adjustable threshold level $V_{TH}$.

Under normal operating conditions the received signals are stable at the center-of-eye sampling times, presumably making direct measurements of transition characteristics impossible. However, if significant skew is present and/or the high-frequency amplification (e.g. CTLE peaking) of the wire input signals is reduced, transitions of mixed subchannel outputs are extended into the usually stable "data eye" region as in FIG. 2A, allowing them to be detected by a sampler being clocked at data-sampling intervals. This may be combined as illustrated in FIG. 2B with the previously described technique of repeated data value transmission. In the illustrated example, each data value is transmitted twice, with the receiver sampling consecutive receive unit intervals for edge transition information (the sample times marked "E") and data (the sample times marked "D"). Consecutive data values detected in this manner may then be used to determine the direction and characteristics of such transitions, guiding analysis of the intermediate edge transition information.

In one embodiment, skew-control circuit 160 operates on the worst received subchannel MIC first, starting with all the wire-specific skew values at zero. It is implemented as the iterative algorithm:
 1. The cost function is calculated at the current solution.
 2. Wire i is skewed S picoseconds forward ("up") and then backward ("down") with skew on the other wires fixed. The cost function is calculated for the two cases.
 3. Looking at the cost function, if up is better than current better than down, we set the direction D(i) to +1 for this wire and if up is worse than current is worse than down, we set the direction D(i) to −1.
 4. After finding the partial derivatives as described above on each of the wires, the wire-specific skew value on wire i is changed by one step in the direction D.

After some iterations of steps 1-4, one can halve the amount of skew S to find the gradient around the current solution more accurately and fine tune the solution. The algorithm is finished if either no change is made in some number of consecutive tries, or a maximum number of iterations is reached.

Relationship of Iterative Analysis to Subchannel Detectors

Vector signaling codes differ in their response to wire skew. Using the Glasswing code as one example, the subchannel detected by a MIC defined by Eqn. 1 is sensitive only to skew between wires W0 and W1, while the subchannel detected by a MIC defined by Eqn. 5 may be influenced by skew among any of wires W0 through W4. Thus, an alternative embodiment may iterate steps 1-4 above on particular subchannels and particular subsets of wires affecting those subchannels, before proceeding to comparisons between those wires and the remainder of the wires, based on iterative measurements of the other subchannels.

In one embodiment offered without implying limitation, MIC0 is used to correct skew between wires W0 and W1, followed by MIC1 correcting skew of wire W2 relative to the assumed baseline of wires W0 and W1. MIC2 is used to correct skew between wires W3 and W4, followed by MIC3 correcting skew of wire W5 relative to the assumed baseline of wires W3 and W4. Finally, MIC4 is used to correct skew between the three wires W0, W1, W2 as a group, and the three wires W3, W4, W5 as a group.

Other vector signaling codes may not offer such opportunity to subset. As a further example, the H4 code of [Cronie I] encodes three subchannels capable of communicating three binary values onto four wires, with each subchannel comparing the sum of two received wire values against the sum of the other two received wire values, in various permutations. Thus, no subchannel relies on less than four wire signals. Still, if all three subchannel results are examined simultaneously, it is possible to identify the contribution of a particular wire to the received skew, optimizing the iterative method. An alternative embodiment utilizes the modified iterative algorithm:

1. The cost function is calculated at the current solution for all subchannels.
2. Wire i is skewed S picoseconds forward ("up") and then backward ("down") with skew on the other wires fixed. The cost function is calculated for all subchannels for the two cases.
3. Looking at the sum of the cost functions across all subchannels, if up is better than current better than down, we set the direction D(i) to +1 for this wire and if up is worse than current is worse than down, we set the direction D(i) to −1. If the sum of the cost functions remains unchanged (e.g. some subchannels are better, some are worse), the direction D(i) is set to 0 for that wire.

After finding the partial derivatives as described above on each of the wires, the skew on the wires is changed by one step in the direction D. If D(i)=0, no change is made to that wire's wire-specific skew value.

Figure 7:
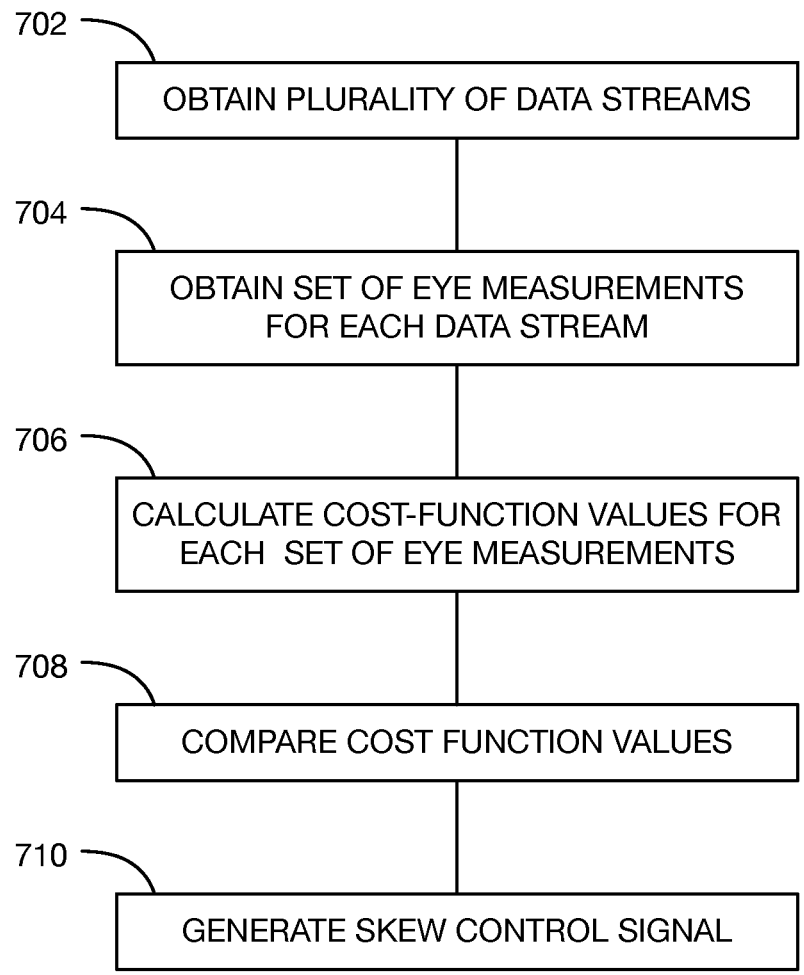
FIG. 7 is a flowchart of a method, in accordance with some embodiments.

FIG. 7 is a flowchart of a method 700, in accordance with some embodiments. As shown, the method includes obtaining, at step 702, a plurality of data streams, the plurality of data streams comprising a data stream in a current condition, a data stream in a skewed-forward condition, and a data stream in a skewed-backward condition. The method further includes calculating, for each data stream in the plurality of data streams, a corresponding set of cost-function values by obtaining, at step 704, a corresponding set of eye measurements, the eye measurements obtained by adjusting a sampling threshold of a sampler generating a plurality of samples of the data stream, the plurality of samples comprising edge samples and data samples, wherein the data stream is sampled at a rate equal to twice a rate of the data stream, and calculating, at step 706, the corresponding set of cost-function values based on the corresponding set of eye measurements. At step 708, the sets of cost function values are compared and a skew control signal is generated at step 710. The skew control signal is used to update one or more wire-specific skew values of corresponding wires of the multi-wire bus.

In some embodiments, the plurality of data streams are receiving from a multi-input comparator (MIC). In some embodiments, the current, skewed-forward, and skewed-backward conditions are obtained by setting a single wire at an input of the MIC in a current, a skewed-forward, and a skewed-backward condition, respectively. In some embodiments, the skew control signal is used to adjust a wire capacitance of the single wire. In such embodiments, the skew control signal comprises a plurality of bits to connect one or more capacitors to the wire by enabling one or more transistors.

In some embodiments, the skew control signal is sent to a transmitter via a backchannel, wherein the transmitter sets the current, skewed-forward, and skewed-backward conditions.

In some embodiments, the plurality of eye measurements comprises top and bottom of eye measurements and top and bottom of edge sample measurements.

In some embodiments, each data stream is a half-rate data stream, and wherein the sampling clock is a full-rate sampling clock. In alternative embodiments, each data stream is a full-rate data stream, and wherein the sampling clock is a double-rate sampling clock. In some embodiments, a coarse skew control signal is generated by sampling half-rate data streams using a full-rate sampling clock, and subsequently a fine skew control signal is generated by sampling full-rate data streams using a double-rate sampling clock.

In some embodiments, a method of skew compensation is used, the method comprising: receiving a plurality of sets of signal elements, wherein each signal element is received over a respective wire of a set of wires of a multiwire bus. The set of signal elements are codewords of an orthogonal code that are transmitted from an encoder/transmitter, but may be received after undergoing unequal delays. The received signal elements are then combined according the sub-channels used to transmit the signals. The combinations are done through a multi-input comparator in the form of a linear amplifier with appropriate weights so as to add and/or subtract the constituent elements according to the sub-channel. The method then determines a set of skew metrics to measure the current channel conditions. Various skew metrics have been described above, including at least (i) upper and lower open-eye thresholds for at least one sub-channel combination, (ii) upper and lower transition thresholds for the at least one sub-channel combination; or both (i) and (ii);

The open-eye thresholds may be determined by adjusting a slicer threshold level such as by increasing the threshold until the point where a logic zero is detected (i.e., the combined voltage is below the threshold) even in the presence of a high signal, and decreasing it until a logic one is detected (i.e., the combined voltage is above the threshold) even in the presence of a low signal. Alternatively, samples may be quantized and compared such that a minimum sample value is selected from a set of sample values obtained from a high signal trace, and a maximum sample value is selected from a set of sample values obtained from a low signal trace.

The skew metrics according to (ii) may be obtained by altering a slicing threshold such that no logic ones are detected at the sampling instant located in the transition region, and then altering the slicing threshold such that no logic zeros are detected at the sampling instant located in the transition region, respectively.

The method also includes altering a skew characteristic of at least one wire of the set of wires and responsively determining a set of adjusted skew metrics according the same descriptions of (i) and (ii) above.

Then, the method includes setting a skew characteristic based on the set of skew metrics and the set of adjusted skew metrics. As described herein, one or more cost functions may be used to determine which skew setting provides better performance. The measurement and adjustments may be performed iteratively as described herein.

The examples presented herein illustrate the use of vector signaling codes for point-to-point wire communications. For purposes of explanation, interconnection between a first transmitting device and a second receiving device have been described as unidirectional signaling networks. However, this should not been seen in any way as limiting the scope of the described invention. The methods disclosed in this application are equally applicable to networks capable of alternating signaling direction (i.e. half duplex), or of providing simultaneous communication between separate transmitters and receivers in both directions (i.e. full duplex.) Similarly, more than one instance of the described invention may be used essentially in parallel to communicate wider data words and/or provide higher overall communication bandwidth, with individual instances having individual embedded clocks, or two or more instances sharing a common clock. Other communication media including optical and wireless communications may similarly be used rather than the described wire interconnections. Thus, descriptive terms herein such as "voltage" or "signal level" should be considered to include equivalents in other measurement systems, such as "optical intensity", "RF modulation", etc. As used herein, the term "physical signal" includes any suitable behavior and/or attribute of a physical phenomenon capable of conveying information. Physical signals may be tangible and non-transitory.

The invention claimed is:

1. A method comprising:
   sequentially obtaining a plurality of data streams, the plurality of data streams comprising a data stream in a current condition, a data stream in a skewed-forward condition, and a data stream in a skewed-backward condition, the plurality of data streams (i) associated with at least one wire of a multi-wire bus and (ii) generated responsive to setting the one wire of the multi-wire bus set in a current, a skewed-forward, and a skewed-backward condition, respectively;
   calculating, for each data stream in the plurality of data streams, a corresponding set of cost-function values by:
   obtaining a corresponding set of eye measurements, the eye measurements obtained by adjusting a sampling threshold of a sampler generating a plurality of samples of the data stream, the plurality of samples comprising edge samples and data samples, wherein the data stream is sampled at a rate equal to twice a rate of the data stream; and
   calculating the corresponding set of cost-function values based on the corresponding set of eye measurements; and
   generating a skew control signal based on a comparison of the sets of calculated cost-function values, the skew control signal for updating a wire-specific skew value of the one wire of the multi-wire bus according to the comparison of the sets of calculated cost-function values.

2. The method of claim 1, wherein obtaining the plurality of data streams comprises receiving the data streams from a multi-input comparator (MIC) connected to a subset of wires of the plurality of wires of the multi-wire bus, the subset of wires comprising the one wire.

3. The method of claim 2, wherein the current, skewed-forward, and skewed-backward conditions comprise setting the one wire at an input of the MIC in the current, the skewed-forward, and the skewed-backward condition, respectively.

4. The method of claim 1, wherein the skew control signal is used to adjust a wire capacitance of the single one wire.

5. The method of claim 4, wherein the skew control signal comprises a plurality of bits to connect one or more capacitors to the wire by enabling one or more transistors.

6. The method of claim 1, wherein the skew control signal is sent to a transmitter via a backchannel, wherein the transmitter sets the one wire in the current, skewed-forward, and skewed-backward conditions.

7. The method of claim 1, wherein the plurality of eye measurements comprises top and bottom of data sample measurements and top and bottom of edge sample measurements.

8. The method of claim 1, wherein a coarse skew control signal is generated by sampling half-rate data streams using a full-rate sampling clock, and subsequently a fine skew control signal is generated by sampling full-rate data streams using a double-rate sampling clock.

9. An apparatus comprising:
   a sampler configured to sequentially receive a plurality of data streams, and for each data stream, generate a corresponding set of samples by sampling the data stream using a sampling clock having a rate equal to twice a rate of the data stream, the plurality of data streams associated with at least one wire of a multi-wire bus and generated and (ii) comprising a data stream in a current condition, a data stream in a skewed-forward condition, and a data stream in a skewed-backward condition responsive to setting the one wire in a current condition, a skewed-forward condition, and a skewed-backward condition, respectively, the plurality of samples comprising edge samples and data samples; and
   a skew control circuit configured to generate a skew control signal, the skew control circuit comprising:
      an eye-measurement circuit configured to form a corresponding set of eye measurements for each data stream, the eye measurements formed by adjusting a sampling threshold of the sampler generating the set of samples;
      a cost-function calculator configured to calculate a corresponding set of cost-function values based on the corresponding set of eye measurements; and
      a cost-function comparison circuit configured to generate the skew control signal based on a comparison of the sets of calculated cost-function values, the skew control signal for updating a wire-specific skew value of the one wire of the multi-wire bus according to the comparison of the sets of calculated cost-function values.

10. The apparatus of claim 9, further comprising a multi-input comparator (MIC) connected to a subset of the plurality of wires of the multi-wire bus, the subset of the plurality of wires comprising the one wire, the MIC configured to provide the plurality data streams to the sampler.

11. The apparatus of claim 10, further comprising a delay circuit configured to set the one wire of the subset of the plurality of wires at an input to the MIC in the current, the skewed-forward, and the skewed-backward condition.

12. The apparatus of claim 11, wherein the delay circuit is configured to set the one wire by adjusting a node capacitance of the wire.

13. The apparatus of claim 12, wherein the skew control signal comprises a plurality of bits, and wherein the delay circuit is configured to connect one or more capacitors to the one wire by enabling one or more transistors according to the plurality of bits of the skew control signal.

14. The apparatus of claim 9, wherein the skew control signal is sent to a transmitter via a backchannel, and wherein the transmitter is configured to set the one wire in the current, skewed-forward, and skewed-backward conditions.

15. The apparatus of claim 9, wherein the plurality of eye measurements comprises top and bottom of data sample measurements and top and bottom of edge sample measurements.

* * * * *